United States Patent [19]

Morisawa et al.

[11] 4,226,200
[45] Oct. 7, 1980

[54] AUTOMATIC TRANSMISSION CASING

[75] Inventors: Kunio Morisawa; Tatsuo Kyushima, both of Toyota, Japan

[73] Assignee: Toyota Jidosha Kogyo Kabushiki Kaisha, Toyota, Japan

[21] Appl. No.: 912,838

[22] Filed: Jun. 5, 1978

[30] Foreign Application Priority Data

Jan. 30, 1978 [JP] Japan ................................. 53/9093

[51] Int. Cl.$^2$ ...................... F16H 37/08; F16H 57/02
[52] U.S. Cl. ............................................... 74/606 R
[58] Field of Search ................ 74/695, 606 R, 606 A, 74/DIG. 1

[56] References Cited

U.S. PATENT DOCUMENTS

| 3,263,521 | 8/1966 | Muller | 74/606 R |
| 3,703,107 | 11/1972 | Piret | 74/606 X |
| 3,745,854 | 7/1973 | Haag et al. | 74/606 R |
| 4,083,266 | 4/1978 | Kneitzberg | 74/606 R |

OTHER PUBLICATIONS

Stockel, M. W., Auto Mechanics Fundamentals, The Goodheart-Willcox Co., Inc., 1969, Chapter 12, p. 242.

Primary Examiner—Werner H. Schroeder
Assistant Examiner—Andrew M. Falik
Attorney, Agent, or Firm—Finnegan, Henderson, Farabow, Garrett & Dunner

[57] ABSTRACT

An automatic transmission for vehicles including a fluid torque converter, a change-over gear mechanism, and an oil pressure control means, wherein the oil pressure control means is substantially composed of a grooved portion formed integrally with the housing of the transmission, a first valve body means adapted to engage a first part of the grooved portion and providing a manual shift valve, and a second valve body means adapted to engage a second part of the grooved portion and providing other hydraulically operated control valves.

9 Claims, 3 Drawing Figures

AUTOMATIC TRANSMISSION CASING

BACKGROUND OF THE INVENTION

The present invention relates to an automatic transmission for vehicles, and, more particularly, to an improvement of an oil pressure control means incorporated in the automatic transmission.

An automatic transmission for vehicles generally comprises a fluid torque converter, a change-over gear mechanism including a plurality of oil pressure servo means and being adapted to provide various speed stages in accordance with change-over of supply of oil pressure to said servo means, and an oil pressure control means which changes over supply of oil pressure to said servo means, wherein said oil pressure control means is composed of a grooved portion formed integrally with the housing of the automatic transmission and a valve body means engaged to said grooved portion, said valve body means including various control valves.

In the conventional automatic transmission a valve body means of the aforementioned kind is constructed as a single body member which incorporates all control valves required for the transmission. However, when, for example, an automatic transmission is constructed to be incorporated in a front engine—front drive vehicle, it is desirable that a line pressure control valve included in the oil pressure control means should be separated from the main structure of the oil pressure control means, i.e. the assembly of the grooved portion and the valve body means; and that, in accordance with this, a manual shift valve included in the oil pressure control means should be arranged at an end portion of the main structure.

SUMMARY OF THE INVENTION

It is therefore an object of the present invention to construct the main structure of the oil pressure control means by dividing the valve body means into first and second separate valve body means so that said first valve body means provides the manual shift valve while said second valve body means provides other hydraulically operated control valves.

In connection with the aforementioned particular structure that a valve body means for providing the manual shift valve should be constructed separately from the other valve body means for providing other hydraulically operated control valves, and in view of the fact that hydraulically operated control valves are liable to stick due to small deformations caused in the valve body means while on the other hand a manual shift valve is fairly immune to such sticking because it is positively driven by hand, it is another object of the present invention to make the valve body means for providing a manual shift valve out of an aluminium alloy instead of out of the cast iron which is commonly used to make such a valve body means, so as to reduce the weight of the transmission and to improve the accuracy of manufacture of the valve body means by employing diecasting.

BRIEF DESCRIPTION OF THE DRAWING

The present invention will become more fully understood from the detailed description given hereinbelow and the accompanying drawings which are given by way of illustration only, and are not intended to limit the present invention, and wherein.

DESCRIPTION OF THE PREFERRED EMBODIMENT

Figure 1:
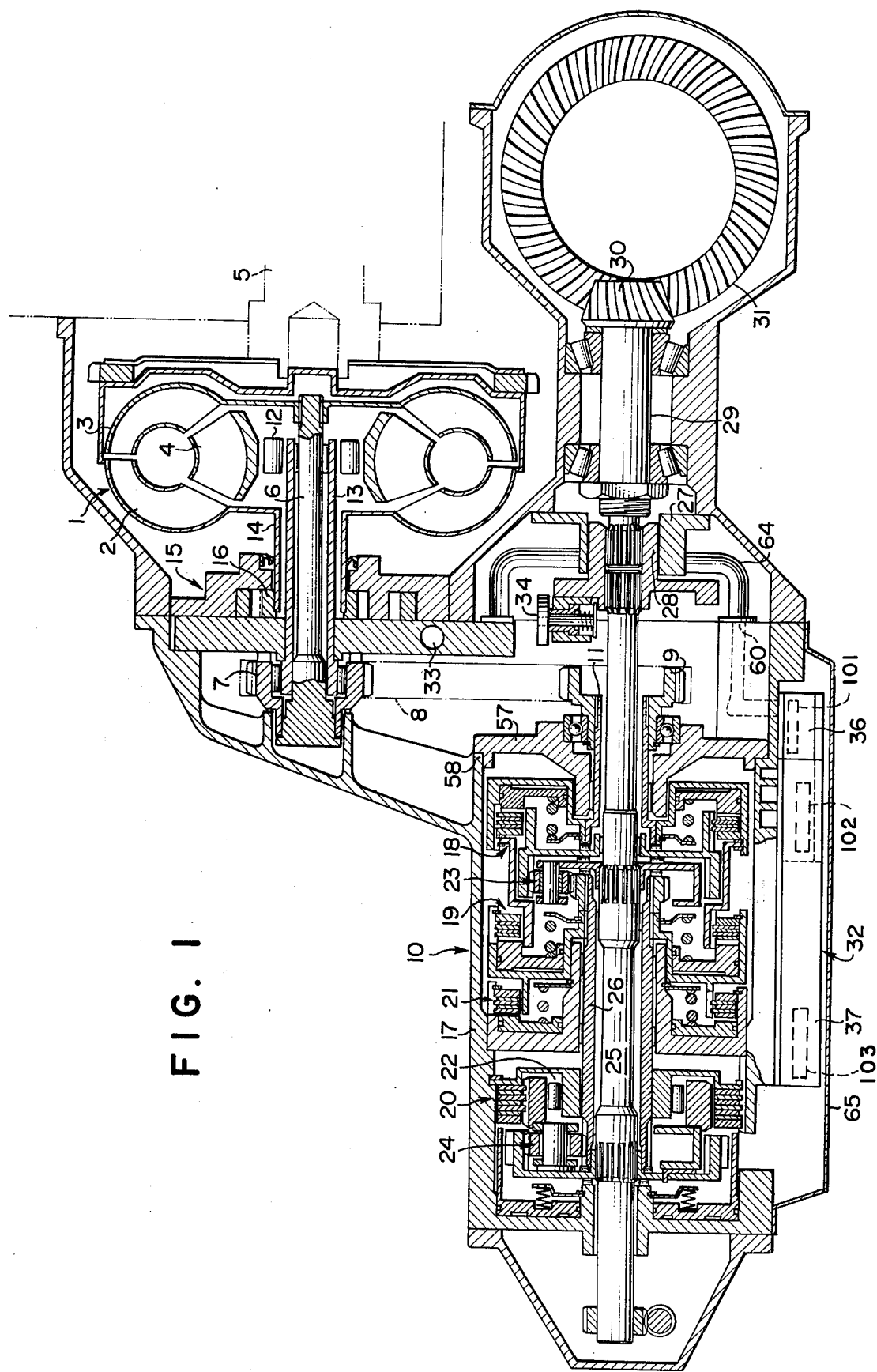
FIG. 1 is a longitudinal sectional view of an embodiment of the automatic transmission of the present invention.

FIG. 1 shows an automatic transmission constructed for use in a front engine—front drive automobile. The driving system of this automatic transmission is the same as that disclosed in Japanese Patent Laying-Open Publication No. 19860/77, arising from Japanese Patent Application No. 95888/75, filed by the assignee company of the present application. The detailed explanation of the driving system, with which the concept of the present invention is not directly related, is available from the aforementioned Laying-Open Publication, if required. In FIG. 1, 1 designates a fluid torque converter which includes a pump impeller 2, a turbine 3, and a stator 4. The pump impeller 2 is connected with and is driven by the output shaft 5 of the engine, both being shown only by phantom lines. The turbine 3 is connected with an output shaft 6 of the torque converter, and its rotational power is transmitted to a hollow input shaft 11 of a change-over gear mechanism 10 by way of a sprocket wheel 7, an endless chain 8 and a sprocket wheel 9. The stator 4 is supported on a fixed shaft 13 by way of a one-way clutch 12. The pump impeller 2 is rotatably supported by a hollow rotary shaft 14 which is directly connected with a drive gear 16 of oil pump 15.

The change-over gear mechanism 10 has a casing 17 which encloses therein a front clutch 18, a reverse clutch 19, a first brake 20, a second brake 21, a one-way clutch 22, a first planetary gear mechanism 23, a second planetary gear mechanism 24, an output shaft 25, and an intermediate shaft 26, and is adapted to transmit the rotational power put in through the input shaft 11 to the output shaft 25 by various reduction ratios in accordance with selective engagement of the clutches 18 and 19 and brakes 20 and 21 effected by the oil pressure control means. In more detail, when the front clutch 18 and the first brake 20 are engaged, the transmission is set in forward first speed stage. When the front clutch 18 and the second brake 21 are engaged, the transmission is set in forward second speed stage. When the front clutch 18 and the reverse clutch 19 are engaged, the transmission is set in forward third speed stage, i.e. in directly connected condition. Finally, when the reverse clutch 19 and the first brake 20 are engaged, the transmission is set in reverse stage.

The output shaft 25 of the change-over gear mechanism 10 is connected with a propeller shaft 29 by means of a rotary sleeve 28 which is rotatably received by a bearing 27. The propeller shaft 29 supports a bevel pinion 30 which engages with a bevel gear 31 so that the rotary output power induced in the output shaft 25 is transmitted through the rotary sleeve 28, the propeller shaft 29, the bevel pinion 30, the bevel gear 31, and a differential gear mechanism not shown in the figure to front wheel shafts not shown in the figure. In the vehicle of the embodiment shown in the figure, which is a front engine—front drive vehicle, the right side in the figure of the transmission assembly herein shown is the forward end and the left side is the rear end.

Below the change-over gear mechanism 10 is incorporated the main portion 32 of the oil pressure control means. On the other hand, at a part of the oil pump 15 is incorporated a line pressure control valve 33 which provides oil pressure of a predetermined level from the delivery pressure of the oil pump 15, although it is not shown in detail in FIG. 1. Furthermore, a governor pressure control valve 34 for generating a governor pressure which changes in accordance with the rotational speed of the output shaft is incorporated in the rotary sleeve 28.

Figure 2:
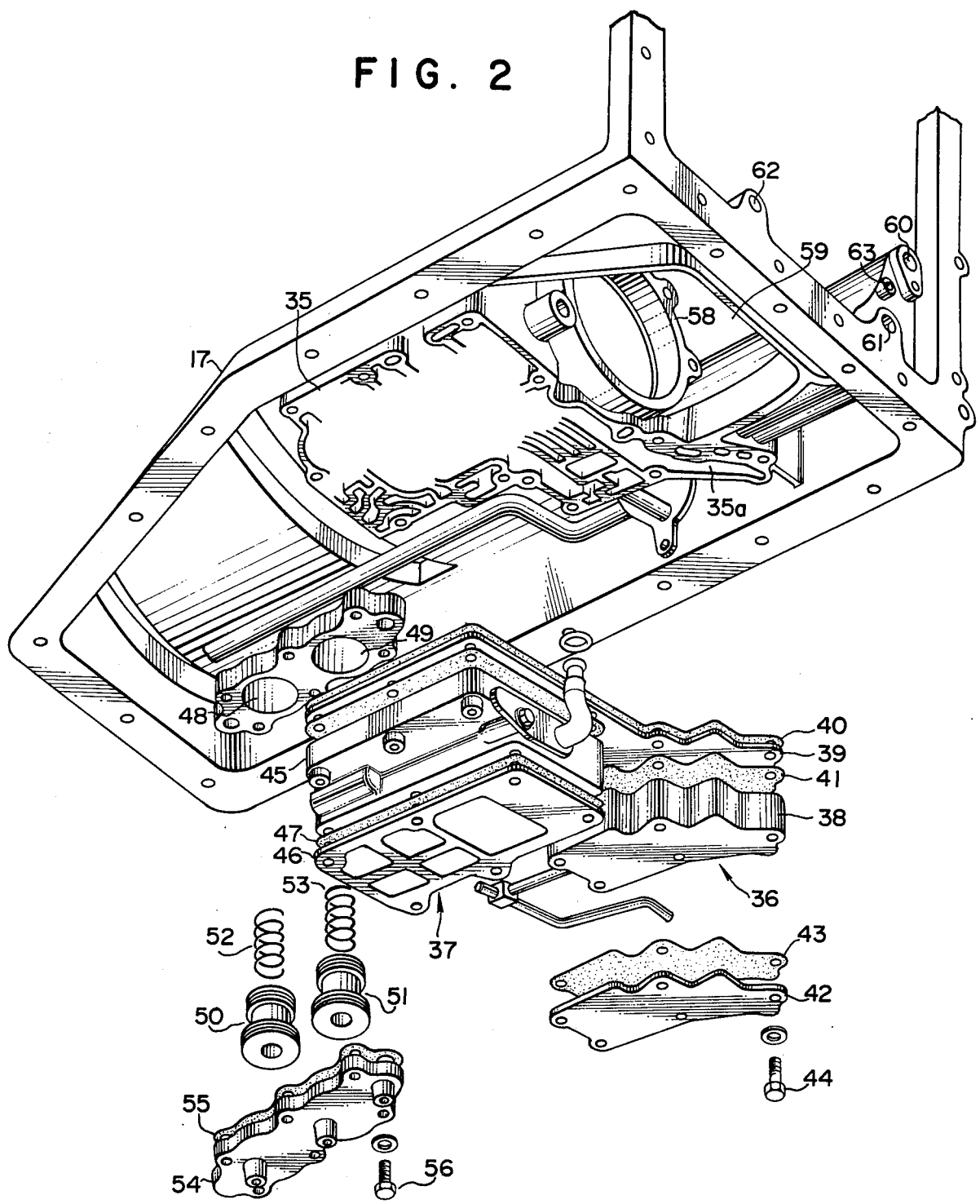
FIG. 2 is an exploded perspective view showing the oil pressure control means incorporated in the automatic transmission shown in FIG. 1.
Figure 3:
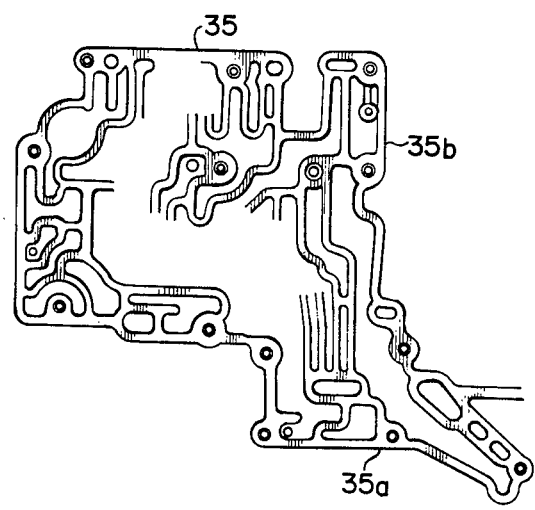
FIG. 3 is a plan view of the grooved portion provided as a part of the casing shown in FIG. 2, wherein the details of the grooved surface are partly omitted.

The main portion 32 of the oil pressure control means includes a manual shift valve adapted to be operated by hand so as to change over speed ranges and various hydraulically operated control valves 102, 103 which are also well known in the art and are adapted to be shifted in accordance with supply or balance of oil pressure, in which are included a throttle pressure control valve for generating a throttle pressure which changes in accordance with depression of the accelerator pedal and speed shift valves adapted to be shifted in accordance with the balance of the throttle pressure and the governor pressure so as to change over supply of oil pressure to the clutches 18 and 19 and the brakes 20 and 21. As shown in FIG. 2 the main portion 32 of the oil pressure control means includes a grooved portion 35 formed as an integral part of the casing 17 at its lower portion and valve body means 36 and 37 adapted to engage the grooved portion. The grooved portion 35 has a grooved face adapted to provide a number of oil passages as shown in FIG. 3 wherein a part of the grooves is omitted for the purpose of simplicity. The valve body means 36 and 37 also have individual grooved faces adapted to co-operate with the grooved face of the grooved portion 35 so as to construct oil pressure circuits including the aforementioned various control valves incorporated in the valve body means 36 and 37. The valve body means 36 comprises a valve body member 38 including a manual shift valve therein, a partition plate 39 having a number of openings for providing passages and orifices and being adapted to be interposed between the valve body member 38 and the grooved portion 35 so as to construct various passages in co-operation with the valve body member and the grooved portion, gaskets 40 and 41, a cover plate 42 for closing the outside face of the valve body member 38, a gasket 43, and clamping bolts such as 44 for clamping the abovementioned members or elements to the grooved portion 35 in an assembled manner. Similarly the valve body means 37 comprises a valve body member 45 incorporating hydraulically operated control valves such as the throttle pressure control valve, speed shift valves, etc., a cover plate 46 and a gasket 47. However, the partition plate 39 and the gaskets 40 and 41 are formed to be common for the valve body means 36 and 37. In the same manner as in the valve body means 36, the valve body member 45 of the valve body means 37 is clamped to the grooved portion 35 by bolts such as 44 with interposition of the partition plate 39 and the gaskets 40 and 41. Cylindrical bores 48 and 49 formed in the casing 17 are bores for constructing accumulators to be incorporated in the oil pressure circuits. In these cylindrical bores are mounted pistons 50 and 51 together with compression coil springs 52 and 53 and thereafter the cylindrical bores are closed by a cover plate 54 which is clamped to the bored portion of the casing 17 by bolts such as 56 with interposition of a gasket 55, thereby constructing accumulators.

As will be understood from FIGS. 2 and 3, the portion 35a of the grooved portion 35 corresponding to the valve body means 36 which provides the manual shift valve is to one side of and forward from the other principal portion 35b of the grooved portion. The casing 17 of the changeover gear mechanism has a front support mounting portion 58 for mounting a front support 57 which supports a front portion of the output shaft 25. In order to finish precisely the end face and the inner peripheral surface of the front support mounting portion 58 by a cutter, a relatively large cutter space 59 must be left in front of the front support mounting portion. Therefore, the grooved portion 35a corresponding to the valve body means 36 for providing the manual shift valve is arranged to extend forward along the side of the cutter space 59. On the other hand, in the automatic transmission constructed particularly for a front engine—front drive vehicle a line pressure control valve 33 located at the entrance of the oil pressure control means as seen in the direction of the flow of oil is separated from the main portion 32 of the oil pressure control means so that it is incorporated in the housing of the oil pump 15, and, therefore, the control element which is positioned at the upstream end of the main portion 32 as seen in the direction of the flow of oil is the manual shift valve. Under this condition, the structure in which the grooved portion 35a for the manual shift valve is arranged so as to extend forward along the side of the cutter space 59 and so as to be close to the forward end of the casing 17 is advantageous for connecting the main portion 32 of the oil pressure control means and the line pressure control valve 33 by way of the front portion of the casing 17. Furthermore, since in this case the governor pressure control valve 34 is also located ahead of the casing 17, the passage connection for the governor pressure control valve 34 is desirably made through the forward end portion of the casing 17 and the bearing member 27. Therefore, by the structure in which the grooved portion 35a is arranged so as to extend forward along the side of the cutter space 59 until it approaches the forward end of the casing 17, the oil passage connections for the line pressure control valve and the governor pressure control valve are conveniently located. At the same time this structure increases mechanical strength of the forward end portion of the casing 17 where a relatively large cutting space 59 is required.

Referring to FIG. 2, the port 60 which opens in the front face of the casing 17 is a line pressure inlet port for receiving the line pressure from the line pressure control valve 33 so as to conduct the line pressure toward the main portion 32 of the oil pressure control means. Similarly, located in the front face of the casing 17 is line pressure delivery port 61 for supplying the line pressure to the governor pressure control valve 34, port 62 for receiving the governor pressure generated by the governor pressure control valve 34, and port 63 for supplying a control pressure to the line pressure control valve 33 so as to increase the line pressure when the automatic transmission is shifted to the reverse stage. The port 60 is connected with the line pressure control valve 33 by way of a line pressure conducting pipe 64. The main portion 32 of the oil pressure control means constructed by the grooved portion 35 and the valve body means 36 and 37 is covered by an oil pan 65 mounted to the bottom end portion of the casing 17.

The casing 17 of the change-over gear mechanism is generally called a transmission case and is generally made of an aluminium alloy wherein the casing is formed by diecasting so as to include the grooved portion 35 as a unitary part thereof. The grooved face of the grooved portion 35 is generally finished by cutting by employing a cutting tool. If the precision of this cutting is insufficent, or if the cutting precision with respect to the mounting faces of the valve body means 36 and 37 which join the grooved face of the grooved portion is insufficient, or, furthermore, if the clamping force applied to the valve body means in the mounting of them to the grooved portion is not well balanced, the valve body means will be deformed due to unbalanced stresses applied thereto. From the point of view of reducing the weight of the transmission and of the possibility of employing diecasting, it is desirable that the valve body means should also be made of an aluminium alloy, like the casing 17. However, if the valve body means is made of an aluminium alloy, they are more liable to deform due to the causes as mentioned above, thereby causing sticking of the control valves incorporated therein, and there is a danger that normal performance of the oil pressure control valve will be lost. Because of this, conventionally the valve body means are generally made of cast iron which has higher rigidity than aluminium alloys. However, the manual shift valve which is operated by hand so as to change over speed ranges is positively driven by hand and is not as liable to stick even when the valve body means has been slightly deformed due to unbalanced clamping, etc. Even when it has stuck, this is immediately known to the driver. By contrast, other hydraulically operated control valves which are shifted in accordance with supply or balance of oil pressure must be able to move by the application of very small force such as a slight unbalance of oil pressures supplied to opposite sides of the valve element, and, therefore, there is a great danger that even a slight deformation caused in the valve body means will cause sticking of the valve element. In view of the abovementioned conditions, in the automatic transmission of the present invention, the grooved portion 35a corresponding to the manual shift valve is arranged so as to extend sideward and forward from the main portion 35b of the grooved portion 35, and at the same time the valve body means 36 which provides a manual shift valve is constructed separately from the valve body means 37 which provides other hydraulically operated control valves, so that the valve body means 37 is made of cast iron as is conventional, while on the other hand, the valve body means 36 is made of an aluminium alloy. By this structure, it is contemplated to reduce the weight of the valve body means on the one hand, while on the other hand it is also contemplated to improve manufacturing accuracy of the valve body means due to the practice of diecasting out of aluminium alloy. As mentioned before, when an automatic transmission is constructed so as to be mounted in a front engine—front drive vehicle, the line pressure control valve is separated from the main portion of the oil pressure control means, and in accordance with this, with respect to the main portion of the oil pressure control means arranged below the change-over gear mechanism, the manual shift valve is located at its forward end where oil pressure is introduced into the main portion. In this case, it is structurally desirable that the portion of the valve body means constructing the main portion of the oil pressure control means which provides the manual shift valve is arranged so as to extend sideward and forward from the remaining portion of the valve body means. However, if the valve body means having such an extended portion is constructed as a unitary body, when the valve body means is processed by a multi-spindle drilling machine so that various bores are simultaneously drilled, a difficulty is encountered. The valve body means is generally formed with a number of bores which extend horizontally as seen in FIG. 3 and these bores are drilled by a number of drills which extend from left to right as seen in FIG. 3. Therefore, a drill which forms a bore in the portion of the valve body means which corresponds to the grooved portion 35a will have a relatively long unsupported middle portion when compared with a drill which forms a bore in the portion of the valve body means which corresponds to the grooved portion 35b. Since it is difficult to provide a guide means or a jig for the unsupported middle portion of the drill due to limitations of space, the long drill is liable to vibrate and the accuracy of drilling is seriously damaged. In this connection, when the valve body means which corresponds to the grooved portion 35a and provides a manual shift valve is constructed separately from the valve body means which corresponds to the grooved portion 35b so as to provide two separate valve body means 36 and 37, the aforementioned problem of vibration of the drill in the drilling process of the valve body means is avoided. In this case, in drilling of the valve body means, it is desirable that the valve body means 36 and 37 are mounted side by side in a multi-spindle drilling machine so that the two valve body means are formed with bores simultaneously without requiring any long drill with a relatively long unsupported middle portion. Thus, the separation of the valve body means into two parts such as the valve body means 36 which provides a manual shift valve and the valve body means 37 which provides other control valves brings about a great advantage in the boring process.

Although the invention has been shown and described with respect to a preferred embodiment thereof, it should be understood by those skilled in the art that various changes and omissions of the form and detail thereof may be made therein without departing from the scope of the invention.

We claim:
1. An automatic transmission, comprising:
 (a) a casing with an integral grooved portion comprising a plurality of oil passage circuits;
 (b) a changeover gear mechanism, supported within the casing and including a plurality of oil pressure operated servo mechanisms, which provides various speed stages in accordance with variation of supply of oil pressure to the servo mechanisms;
 (c) a first valve body member directly engaged with a first part of the grooved portion and which incorporates a manually controlled shift valve which when operated varies supply of oil pressure to the servo mechanisms and changes over the speed stages manually; and
 (d) a second valve body member directly engaged with a second part of the grooved portion and which incorporates a plurality of hydraulically operated control valves which shift in accordance with supply of oil pressure, and which by shifting varies supply of oil pressure to the servo mechanisms and change over said speed stages automatically.

2. The transmission of claim 1, further comprising a fluid torque converter, a line pressure control valve and a governor pressure control valve, both of which are located separately from the grooved portion and from the first and second valve body members, and a differential; wherein rotary power is transmitted in a first direction through said torque converter to said changeover gear mechanism, and then, in the opposite direction, to said differential; said line pressure control valve and said governor pressure control valve being located in said opposite direction from said grooved portion; said grooved portion being located on the underneath face of the casing; and wherein said first part of said grooved portion extends from said second part of said grooved portion in said opposite direction and to one side thereof.

3. The transmission of claim 2, wherein said casing is formed with a support mounting portion and an empty cutter space in said opposite direction from said support mounting portion, said cutter space being bordered along its one lower side to said first part of said grooved portion of said casing; and further comprising a support mounted in the support mounting portion.

4. The transmission of claim 2, further comprising an oil conduit system connected to the end in said opposite direction of said first part of said grooved portion, and extending in said opposite direction therefrom to the extremity in said opposite direction of said casing, thereby connecting said manually controlled shift valve and said hydraulically operated control valves with said line pressure control valve and said governor pressure control valve.

5. The automatic transmission of claim 1, wherein said automatic transmission includes a fluid torque converter and oil pressure control means for changing over supply of oil pressure to said servo mechanisms and is adapted to be incorporated in a front engine—front drive vehicle in a manner such that the rotational power of the engine is first transmitted rearward through the fluid torque converter to the changeover gear mechanism and is secondly transmitted forward from the changeover gear mechanism to the differential for the front wheel shafts and includes a line pressure control valve and a governor pressure control valve, both being arranged separately from the main portion of said oil pressure control means which is substantially composed of said grooved portion and said first and second valve body means, said line pressure control valve and said governor pressure control valve being located ahead of said main portion of said oil pressure control means, said grooved portion being arranged below said changeover gear mechanism, wherein said first part of said grooved portion is arranged so as to extend sideward and forward from said second part of said grooved portion.

6. The automatic transmission of claim 5, wherein said casing includes a front support mounting portion, a front support mounted to said front support mounting portion and a cutter space left in front of said front support mounting portion and bordered by said first part of said grooved portion along one side thereof.

7. The automatic transmission of claim 5, wherein said casing includes passage means connected to said first part of said grooved portion at its forward end and extending forward therefrom to the forward end of said casing, said passage means serving to connect the main portion of said oil pressure control means with said line pressure control valve and said governor pressure control valve.

8. The automatic transmission of either of claims 1 or 2, wherein said first valve body member is made of a first material and said second valve body member is made of a second material which is different from said first material.

9. The automatic transmission of claim 8, wherein said first material is an aluminium alloy, and said second material is cast iron.

* * * * *